(12) United States Patent  
Fukuda et al.

(10) Patent No.: US 9,225,607 B2  
(45) Date of Patent: Dec. 29, 2015

(54) NETWORK SYSTEM AND TOPOLOGY MAP GENERATING METHOD

(75) Inventors: Takeshi Fukuda, Tokyo (JP); Kenji Senoh, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 8 days.

(21) Appl. No.: 14/373,744

(22) PCT Filed: Feb. 23, 2012

(86) PCT No.: PCT/JP2012/054365  
§ 371 (c)(1),  
(2), (4) Date: Jul. 22, 2014

(87) PCT Pub. No.: WO2013/125002  
PCT Pub. Date: Aug. 29, 2013

(65) Prior Publication Data  
US 2015/0030328 A1    Jan. 29, 2015

(51) Int. Cl.  
*H04B 10/27* (2013.01)  
*H04L 12/24* (2006.01)  
(Continued)

(52) U.S. Cl.  
CPC ............... *H04L 41/12* (2013.01); *G06F 13/00* (2013.01); *H04B 10/27* (2013.01); *H04L 12/44* (2013.01)

(58) Field of Classification Search  
CPC ............. H04B 10/27; H04J 2203/0039; H04J 2203/0055; H04L 41/12; H04L 12/44; G06F 13/00  
USPC ............. 398/25, 58, 67, 70–72; 370/252, 255  
See application file for complete search history.

(56) References Cited

U.S. PATENT DOCUMENTS

| | | | |
|---|---|---|---|
| 7,894,362 B2* | 2/2011 | Effenberger | H04L 12/66 370/252 |
| 8,442,398 B2 | 5/2013 | Li et al. | |
| 2006/0045027 A1* | 3/2006 | Galou | H04L 41/12 370/255 |

(Continued)

FOREIGN PATENT DOCUMENTS

| | | |
|---|---|---|
| CN | 101572832 A | 11/2009 |
| CN | 102223185 A | 10/2011 |

(Continued)

OTHER PUBLICATIONS

International Search Report issued Mar. 19, 2012, in PCT/JP2012/054365, filed Feb. 23, 2012.

(Continued)

*Primary Examiner* — Dalzid Singh  
(74) *Attorney, Agent, or Firm* — Oblon, McClelland, Maier & Neustadt, L.L.P.

(57) ABSTRACT

A network system that is able to automatically generate a topology map. A PON topology generation part of a network system with a predetermined network including an OLT and a plurality of ONUs performs a topology map generation process. The topology map generation process includes: (a) calculating a plurality of numbers Nci of 2-branches that are the numbers of 2-branches of splitters on a transmission path between the OLT and the plurality of ONUs, based on a plurality of transmission distances Li, a plurality of downstream transmission power values PT and a plurality of downstream reception power values PRi; and (b) generating a topology map based on the plurality of numbers Nci of 2-branches and the plurality of transmission distances Li.

6 Claims, 16 Drawing Sheets

(51) Int. Cl.
*H04L 12/44* (2006.01)
*G06F 13/00* (2006.01)

(56) References Cited

U.S. PATENT DOCUMENTS

| | | |
|---|---|---|
| 2007/0201385 A1 | 8/2007 | Goto et al. |
| 2009/0304381 A1* | 12/2009 | Muppidi ............ H04B 10/0773 398/34 |
| 2011/0038632 A1 | 2/2011 | Zou |
| 2011/0262142 A1* | 10/2011 | Archambault .......... H04J 14/02 398/83 |
| 2013/0251362 A1 | 9/2013 | Li et al. |

FOREIGN PATENT DOCUMENTS

| | | |
|---|---|---|
| EP | 2 141 832 A1 | 1/2010 |
| JP | 2007-166446 | 6/2007 |
| JP | 2007-228382 | 9/2007 |
| WO | 2008/134961 A1 | 11/2008 |
| WO | 2010/048034 A2 | 4/2010 |

OTHER PUBLICATIONS

Taiwanese Search Report issued Jan. 20, 2014, in Patent Application No. 101115538 (with English-language translation).
International Preliminary Report on Patentability issued Sep. 4, 2014 in PCT/JP2012/054365 (with English Translation).

* cited by examiner

| ONU NUMBER | THE NUMBER OF 2-BRANCHES ($N_{ci}$) | DISTANCE ($L_i$) | GROUP NUMBER |
|---|---|---|---|
| | | | |
| | | | |
| | | | |

FIG. 4

| ONU NUMBER | THE NUMBER OF 2-BRANCHES (Nci) | DISTANCE (Li) | GROUP NUMBER |
|---|---|---|---|
|  | 4 | 30 |  |
|  | ... | ... |  |
|  | 4 | 25 |  |
|  | 4 | 10 |  |
|  | 5 | 9 |  |
|  | 5 | 23 |  |
|  | ... | ... |  |
|  | 5 | 7 |  |
|  | 6 | 1 |  |
|  | ... | ... |  |
|  | 6 | 3 |  |

FIG. 5

| ONU NUMBER | THE NUMBER OF 2-BRANCHES (Nci) | DISTANCE (Li) | GROUP NUMBER |
|---|---|---|---|
|  | 4 | 10 |  |
|  | ... | ... |  |
|  | 4 | 25 |  |
|  | 4 | 30 |  |
|  | 5 | 7 |  |
|  | 5 | 9 |  |
|  | ... | ... |  |
|  | 5 | 23 |  |
|  | 6 | 1 |  |
|  | ... | ... |  |
|  | 6 | 3 |  |

FIG. 6

| ONU NUMBER | THE NUMBER OF 2-BRANCHES (Nci) | DISTANCE (Li) | GROUP NUMBER |
|---|---|---|---|
| 1 | 4 | 10 | 1 |
| 2 | 4 | 11 | 1 |
| 3 | 4 | 11 | 1 |
| 4 | 4 | 11 | 1 |
| 5 | 4 | 12 | 1 |
| 6 | 4 | 12 | 1 |
| 7 | 4 | 12 | 1 |
| 8 | 4 | 12 | 1 |
| 9 | 4 | 13 | 2 ← THE NUMBER OF ONUs EXCEEDS DB (=8) |
| 10 | 4 | 14 (=13+1) | 2 |
| 11 | 4 | 17 (=13+4) | 2 |
| 12 | 4 | 21 (=13+8) | 2 |
| 13 | 4 | 24 (=13+11) 11>DL | 3 ← DIFFERENCE IN DISTANCE EXCEEDS DL (=10) |
| 14 | 4 | 26 (=24+2) | 3 |
| ... | ... | ... | ... |

F I G. 7

| GROUP NUMBER | THE NUMBER OF BELONGING ONUs (Nj) | THE NUMBER OF 2-BRANCHES (Ncj) | SHORTEST DISTANCE OF BELONGING ONU (Lminj) | THE NUMBER OF REMAINING 2-BRANCHES (Cj) | ONU-CLOSEST SPLITTER ID |
|---|---|---|---|---|---|
| 1 | 8 | 4 | 10 | 4 | |
| 2 | 4 | 4 | 13 | 4 | |
| 3 | 5 | 4 | 24 | 4 | |
| 4 | 3 | 5 | 7 | 5 | |
| ... | ... | ... | ... | ... | |
| n-2 | 2 | 8 | 32 | 8 | |
| n-1 | 6 | 9 | 4 | 9 | |
| n | 4 | 13 | 13 | 13 | |

FIG. 9

| GROUP NUMBER | THE NUMBER OF BELONGING ONUs (Nj) | THE NUMBER OF 2-BRANCHES (Ncj) | SHORTEST DISTANCE OF BELONGING ONU (Lmin) | THE NUMBER OF REMAINING 2-BRANCHES (Cj) | ONU-CLOSEST SPLITTER ID |
|---|---|---|---|---|---|
| 1 | 8 | 4 | 10 | 1 (−3) | |
| 2 | 4 | 4 | 13 | 2 (−2) | |
| 3 | 5 | 4 | 24 | 1 (−3) | |
| 4 | 3 | 5 | 7 | 3 (−2) | |
| ... | ... | ... | ... | ... | |
| n−2 | 2 | 8 | 32 | 7 (−1) | |
| n−1 | 6 | 9 | 4 | 6 (−3) | |
| n | 4 | 13 | 13 | 11 (−2) | |

FIG. 10

| GROUP NUMBER | THE NUMBER OF BELONGING ONUs (Nj) | THE NUMBER OF 2-BRANCHES (Ncj) | SHORTEST DISTANCE OF BELONGING ONU (Lmin) | THE NUMBER OF REMAINING 2-BRANCHES (Gj) | ONU-CLOSEST SPLITTER ID |
|---|---|---|---|---|---|
| 1 | 8 | 4 | 10 | 1 (−3) | |
| 3 | 5 | 4 | 24 | 1 (−3) | |
| 2 | 4 | 4 | 13 | 2 (−2) | |
| 4 | 3 | 5 | 7 | 2 | |
| ... | ... | ... | ... | ... | |
| n−2 | 6 | 9 | 4 | 6 (−3) | |
| n−1 | 2 | 8 | 32 | 7 (−1) | |
| n | 4 | 13 | 13 | 11 (−2) | |

| SPLITTER ID | STAGE ORDER (Sk) | THE NUMBER OF CONNECTIONS (NUMk) | PARENT SPLITTER ID |
|---|---|---|---|
| 1 | 1 | 0 | 0 |
| | | | | rootID →

F I G. 1 3

| GROUP NUMBER | THE NUMBER OF BELONGING ONUs (Nj) | THE NUMBER OF 2-BRANCHES (Ncj) | SHORTEST DISTANCE OF BELONGING ONU (Lming) | THE NUMBER OF REMAINING 2-BRANCHES (Cj) | ONU-CLOSEST SPLITTER ID |
|---|---|---|---|---|---|
| 1 | 8 | 4 | 10 | 0 | |
| 3 | 5 | 4 | 24 | 0 | |
| 2 | 4 | 4 | 13 | 0 | |
| 4 | 3 | 5 | 7 | 0 | |
| ... | ... | ... | ... | ... | |
| n-2 | 6 | 9 | 4 | 3 | |
| n-1 | 2 | 8 | 32 | 4 | |
| n | 4 | 13 | 13 | 8 | |

FIG. 14

| GROUP NUMBER | THE NUMBER OF BELONGING ONUs (Nj) | THE NUMBER OF 2-BRANCHES (Ncj) | SHORTEST DISTANCE OF BELONGING ONU (Lmin) | THE NUMBER OF REMAINING 2-BRANCHES (Cj) | ONU-CLOSEST SPLITTER ID |
|---|---|---|---|---|---|
| 1 | 8 | 4 | 10 | 0 | 1-1 |
| 3 | 5 | 4 | 24 | 0 | 1-2 |
| 2 | 4 | 4 | 13 | 0 | 1-3 |
| 4 | 3 | 5 | 7 | 0 | 1-4 |
| ... | ... | ... | ... | ... | |
| n-2 | 6 | 9 | 4 | 3 | |
| n-1 | 2 | 8 | 32 | 4 | |
| n | 4 | 13 | 13 | 8 | |

F I G. 1 5

| SPLITTER ID | STAGE ORDER (Sk) | THE NUMBER OF CONNECTIONS (NUMk) | PARENT SPLITTER ID |
|---|---|---|---|
| 1 | 1 | 4 (1-1 to 1-4) | 0 |
| 1-1 | 2 | 1 | 1 |
| 1-2 | 2 | 1 | 1 |
| 1-3 | 2 | 1 | 1 |
| 1-4 | 2 | 1 | 1 |
| | | | | rootID → points to row with SPLITTER ID = 1

F I G. 1 6

| SPLITTER ID | STAGE ORDER (Sk) | THE NUMBER OF CONNECTIONS (NUMk) | PARENT SPLITTER ID |
|---|---|---|---|
| 1 | 1 | 3 (1-1 to 1-3) | 0 |
| 1-1 | 2 | 1 | 1 |
| 1-2 | 2 | 1 | 1 |
| 1-3 | 2 | 1 | 1 |
| | | | | rootID → points to row with SPLITTER ID = 1

| SPLITTER ID | STAGE ORDER (Sk) | THE NUMBER OF CONNECTIONS (NUMk) | PARENT SPLITTER ID |
|---|---|---|---|
| 1 | 1 | 3 | 0 |
| 1-1 | 2 | 1 | 1 |
| 1-2 | 2 | 1 | 1 |
| 1-3 | 2 | 1 | 1 |
| rootID → 1-4 | 2 | 0 | 1 |
| | | | |

FIG. 19

| GROUP NUMBER | THE NUMBER OF BELONGING ONUs (Nj) | THE NUMBER OF 2-BRANCHES (Ncj) | SHORTEST DISTANCE OF BELONGING ONU (Lmin) | THE NUMBER OF REMAINING 2-BRANCHES (Cj) | ONU-CLOSEST SPLITTER ID |
|---|---|---|---|---|---|
| 1 | 8 | 4 | 10 | 0 | 1-1 |
| 2 | 4 | 4 | 13 | 0 | 1-2 |
| ... | ... | ... | ... | ... | ... |
| n-2 | 2 | 8 | 32 | 0 | 1-4-2-1 |
| n-1 | 6 | 9 | 4 | 0 | 1-4-2-2 |
| n | 4 | 13 | 13 | 0 | 1-4-2-3-1 |

| SPLITTER ID | STAGE ORDER (Sk) | THE NUMBER OF CONNECTIONS (NUMk) | PARENT SPLITTER ID |
|---|---|---|---|
| 1 | 1 | 4 | 0 |
| 1-1 | 2 | 1 | 1 |
| ... | ... | ... | ... |
| 1-4 | 2 | 1 | 1 |
| ... | ... | ... | ... |
| 1-4-2-2 | 4 | 1 | 1-4-2 |
| 1-4-2-3 | 4 | 1 | 1-4-2 |
| 1-4-2-3-3 | 5 | 1 | 1-4-2-3 |

F I G . 2 2
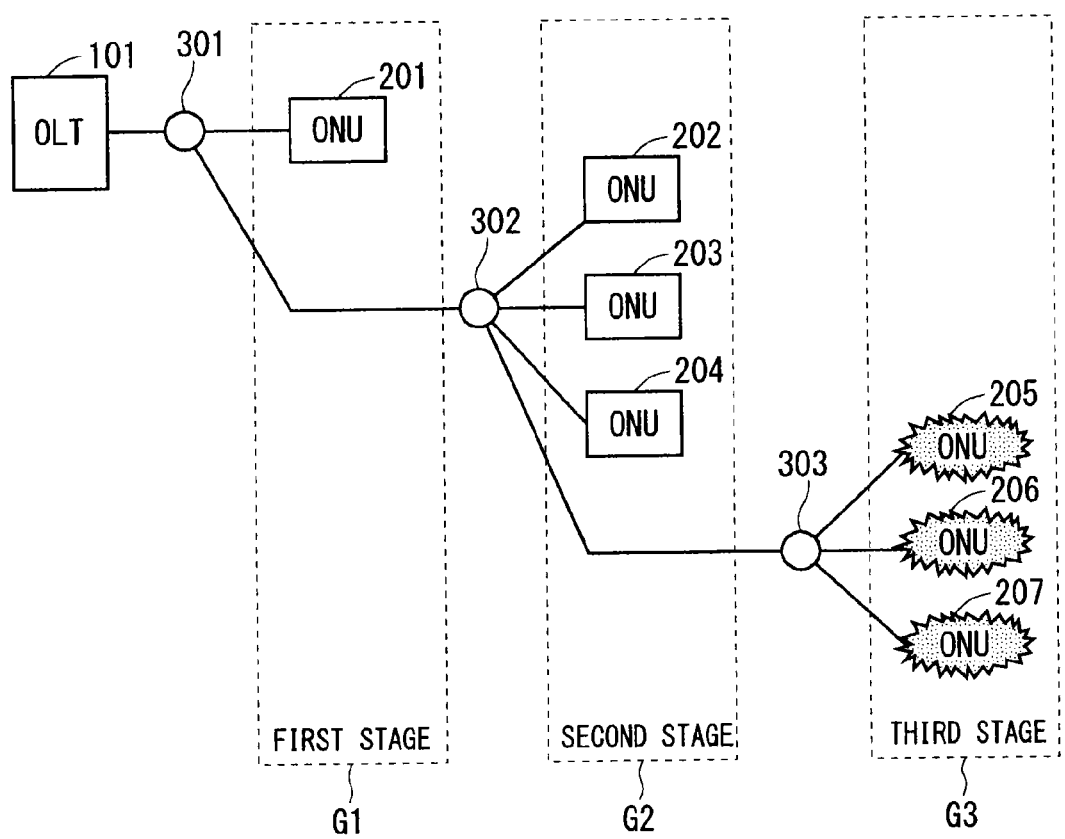

NETWORK SYSTEM AND TOPOLOGY MAP GENERATING METHOD

TECHNICAL FIELD

The present invention relates to a network system, such as a PON (Passive Optical Network), including an OLT (Optical Line Terminal) and a plurality of ONUs (Optical Network Units), and particularly relates to a technique for generating a topology map between the OLT and the plurality of ONUs.

BACKGROUND ART

Recently, the widespread use of Internet allows users to access and obtain various information provided at sites that are run in various places of the world. This leads to the widespread use of broadband accesses such as ones through ADSLs (Asymmetric Digital Subscriber Lines) and FTTH (Fiber To The Home) including a PON, too.

An optical fiber link is a technique that is most likely to satisfy the service providers' demand that a high bandwidth communication be combined with long reach of economic development. An optical fiber, which has taken over a long-haul network backbone, is emerging in metropolitan areas. Access networks, however, have a large number of terminal points, and therefore require a different network topology than SONET (Synchronous Optical Network) or DWDM (Dense Wavelength Division Multiplexing) which are used in long-haul networks and metro networks.

A passive optical network (PON), which includes an optical line terminal (OLT) in a telephone station, optical network units (ONUs) at subscribers' residences, shared fiber networks, and passive optical splitters, offers powerful advantages for broadband access networks. For several decades, Ethernet (a registered trademark) (IEEE 802.3) has been widely used in local area networks. More recently, Ethernet (a registered trademark) is a general-purpose LAN that has been used with increasing frequency in metro and other wide area optical network applications, including passive optical networks. In the following, for convenience of the description, Ethernet (a registered trademark) is simply referred to as "general-purpose LAN".

Passive optical networks (EPONs), in gigabit general-purpose LANs and general-purpose LANs based on the newly emerging IEEE 802.3std (Section5) protocol standard, offer a high capacity and a low cost necessary for wide economic development.

As specified in IEEE 802.3ah, passive optical networks in general-purpose LANs have a communication range of up to 20 km, and an area supported by one PON interface in one OLT ranges widely. The number of connectable ONUs is up to 64. In a case where a failure occurs not in the ONU but in a transmission channel, that is, in a case where disconnection of an optical fiber or a failure of an optical splitter occurs, it is very difficult to identify the location at which the failure is occurring by human labor.

Patent Document 1, which shows a PON system, discloses a method for enhancing the accuracy of estimate of a location where a malfunction is occurring in a passive optical network based on a general-purpose LAN including optical network units. In this method, a threshold value determination part of a station-side device that receives PON topology information (information of the distance of the optical transmission channel and the stage order of the optical splitter) sets a threshold value for the number of times an error occurs in general-purpose LAN frames that are received per unit time with respect to each residence-side device. The threshold value is set to be a value resulting from adding, to a predetermined value, a value obtained by multiplying the distance of the optical transmission channel by a factor or a value obtained by multiplying the stage order of the optical splitter by a factor. As for the optical splitter, too, a threshold value is set by multiplying, by a factor, the sum of threshold values of all the residence-side devices that belong to the optical splitter. Upon reception of an error detection signal from an error detection part, the determination part obtains the number of times an error occurred per unit time in the residence-side device or in the optical splitter, and compares the obtained value with the threshold value, to determine whether or not a malfunction occurred.

PRIOR-ART DOCUMENTS

Patent Documents

Patent Document 1: Japanese Patent Application Laid-Open NO. 2007-166446

SUMMARY OF THE INVENTION

Problems to be Solved by the Invention

In the conventional network systems disclosed in the Patent Document 1 and the like, an input state is detected based on the PON topology information (information of the distance of the optical transmission channel and the stage order of the optical splitter) that has been inputted in advance, and in a case where a malfunction occurs, a failure determination is performed based on the frequency of occurrence of an error frame. Thereby, the accuracy of detection of malfunction is enhanced. In this system, therefore, a manual input is precondition for generation of the PON topology information. This involves a problem that labors and costs are required for the input of the topology information.

An object of the present invention is to solve the above-described problem, and to provide a network system that is able to automatically generate a topology map and a method for generating the topology map.

Means for Solving the Problems

A network system according to the present invention is a network system with a predetermined network including an OLT and a plurality of ONUs, the OLT having a distance information acquisition function for obtaining distance-related information concerning a transmission distance between the OLT and each of the plurality of ONUs, a power information acquisition function provided in between the OLT and the plurality of ONUs for obtaining at least one of first power information and second power information as a transmission-channel-loss parameter group, the first power information including a downstream transmission power value of the OLT and downstream reception power values of the plurality of ONUs at a time of downstream transmission from the OLT to the plurality of ONUs, the second power information including upstream transmission power values of the plurality of ONUs and an upstream reception power value of the OLT at a time of upstream transmission from the plurality of ONUs to the OLT, the network system further including a topology map generation part for generating a topology map by performing a topology map generation process based on a plurality of distance-related information and a plurality of transmission-channel-loss parameter groups that are a plurality of the distance-related information and a plurality of the transmission-channel-loss parameter groups between the OLT and the plurality of ONUs, the topology map generation process including the steps of: (a) calculating a plurality of numbers of 2-branches that are the numbers of 2-branches of splitters on a transmission path between the OLT and the plurality of ONUs, based on a plurality of transmission distances and the plurality of transmission-channel-loss parameter groups, the plurality of transmission distances being transmission distances between the OLT and the plurality of ONUs which are obtained by the plurality of distance-related information; and (b) generating the topology map based on the plurality of numbers of 2-branches and the plurality of transmission distances.

Effects of the Invention

The network system of the present invention includes the topology map generation part that generates a topology map by performing the topology map generation process based on the plurality of distance-related information and the plurality of transmission-channel-loss parameter groups, thereby enabling automatic generation of a topology map within a system.

These and other objects, features, aspects and advantages of the present invention will become more apparent from the following detailed description of the present invention when taken in conjunction with the accompanying drawings.

BRIEF DESCRIPTION OF THE DRAWINGS

[FIG. 4] An explanatory diagram showing contents of the group processing in the topology map generation process.

[FIG. 5] An explanatory diagram showing contents of the group processing in the topology map generation process.

[FIG. 6] An explanatory diagram showing contents of the group processing in the topology map generation process.

[FIG. 7] An explanatory diagram showing contents of the group processing in the topology map generation process.

[FIG. 9] An explanatory diagram showing contents of the group processing in the topology map generation process.

[FIG. 10] An explanatory diagram showing contents of the group processing in the topology map generation process.

[FIG. 13] An explanatory diagram showing the splitter tree generation process.

[FIG. 14] An explanatory diagram showing the splitter tree generation process.

[FIG. 15] An explanatory diagram showing the splitter tree generation process.

[FIG. 16] An explanatory diagram showing the splitter tree generation process.

[FIG. 19] An explanatory diagram showing the splitter tree generation process.

[FIG. 22] An explanatory diagram showing an example of use of a topology map that has been automatically generated by the network system according to this embodiment.

EMBODIMENT FOR CARRYING OUT THE INVENTION

<Configuration>

Figure 1:
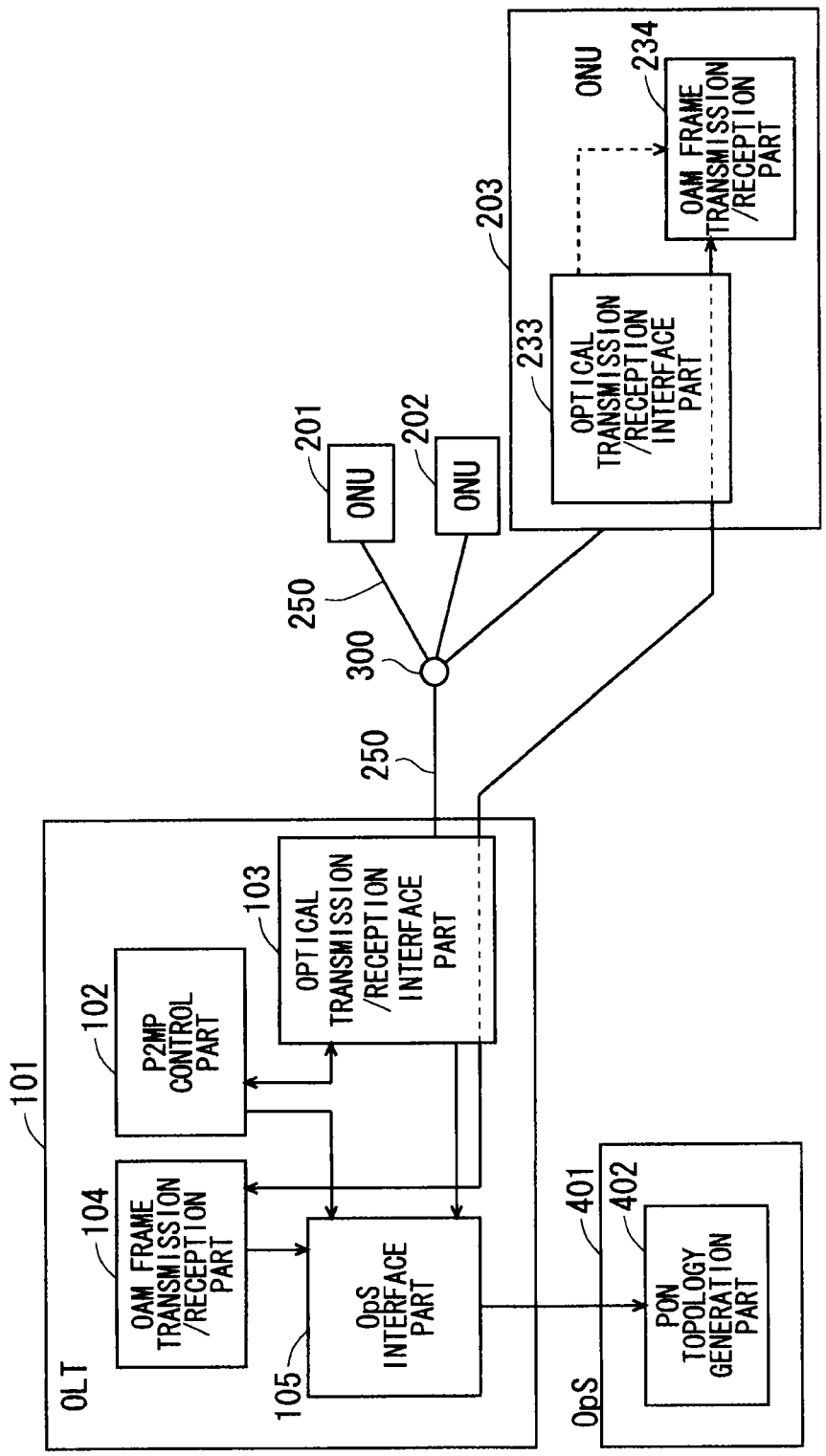
[FIG. 1] A block diagram showing a configuration of a network system according to an embodiment of the present invention.

FIG. 1 is a block diagram showing a configuration of a network system according to an embodiment of the present invention. The network system of this embodiment includes an OLT, a plurality of ONUs, and a monitor control system 401 in which a PON topology generation part 402 (topology map generation part) is provided. The OLT and the plurality of ONUs have an OAM (Operation, Administration, and Maintenance) function and a P2MP function specified in the IEEE 802.3Std in a GE-PON device. The PON topology generation part 402 automatically generates a PON topology map.

As shown in FIG. 1, a passive optical network based on a general-purpose LAN includes an OLT 101, a plurality of ONUs 201 to 203 (for convenience of the illustration, three ONUs are shown in FIG. 1), an optical fiber 250, and an optical splitter 300. The OLT 101 is placed in a station building. The plurality of ONUs 201 to 203 are placed in residences/premises. The optical fiber 250 is laid so as to extend from the OLT 101 placed in the station building to the ONUs 201 to 203 placed in the residences/premises. The optical splitter 300 divides the optical fiber 250.

In addition to such a basic network configuration, the monitor control system 401 is connected such that it is allowed to receive data from the OLT. The monitor control system 401 is called an OpS (Operation System) for maintenance and monitoring of the network state.

The OLT 101 includes a P2MP (Point to Multipoint) control part 102, an optical transmission/reception interface part 103, an OAM frame transmission/reception part 104, and an OpS interface part 105.

The P2MP control part 102 has a P2MP discovery function (a function for obtaining distance information) and an upstream signal control function for controlling an upstream signal supplied from the ONUs 201 to 203.

The optical transmission/reception interface part 103 transmits and receives optical transmission/reception signals to and from the ONUs 201 to 203. At this time, downstream optical transmission power for transmission to each ONU and upstream optical reception power for reception from each ONU can be measured.

The OAM frame transmission/reception part 104 transmits and receives data by means of OAM frames to and from the ONUs 201 to 203 via the optical transmission/reception interface part 103.

The OpS interface part 105, which serves as a data transmission part, is configured to transmit data concerning a topology map parameter to the PON topology generation part 402 of the monitor control system 401.

Each of the ONUs 201 to 203 includes an optical transmission/reception interface part 233 and an OAM frame transmission/reception part 234. Although FIG. 1 illustrates the parts 233 and 234 only in the ONU 203 for convenience of the description, the parts 233 and 234 are obviously provided in the ONUs 201 and 202, too.

The optical transmission/reception interface part 233 transmits and receives an optical transmission/reception signal to and from the OLT 101. At this time, upstream optical transmission power for transmission to the OLT and downstream optical reception power for reception from the OLT can be measured.

The OAM frame transmission/reception part 234 transmits and receives data by means of OAM frames to and from the OLT 101 via the optical transmission/reception interface part 233.

In such a passive optical network based on a general-purpose LAN, in a case where a new ONU is connected under the OLT 101, the OLT 101 exerts the P2MP discovery function under control by the P2MP control part 102, based on the transmission and reception performed between the optical transmission/reception interface part 103 and the optical transmission/reception interface part 233 of the ONU 203. This P2MP discovery function allows measurement of a RTT (Round Trip Time: frame round trip time (round-trip transmission and reception time)) required for a round trip between the OLT 101 and the ONU 203, so that a measurement value RTT which is one element included in distance-related information is obtained.

The P2MP discovery function will be described below. The P2MP discovery function, which is specified in the IEEE 802.3ah, is a function for, when an ONU is connected to an OLT of a PON, automatically discovering the ONU and automatically establishing a communication link between the OLT and the ONU. During a sequence of the P2MP discovery, the OLT measures a RTT for a round trip between the OLT and the ONU, to obtain the measurement value RTT. After this, the RTT is periodically measured. Therefore, after the ONU is disconnected and then connected again, the RTT is measured again. This enables the OLT to constantly obtain a transmission distance through a calculation process based on the measurement value RTT.

A DDM (Digital Diagnostics Monitoring) function for measuring optical reception power, which is specified in the SFF-8472 standard allows each of the OLT 101 and ONUs 201 to 203 to measure optical transmission power and optical reception power for transmission and reception it is performing and then hold measurement results as an optical transmission power value and an optical reception power value.

As for the upstream optical transmission power values and the downstream optical reception power value held in the ONUs 201 to 203, an OAM function which is specified in the IEEE 802.3std similarly to the P2MP function allows an optical transmission/reception process to be performed between the optical transmission/reception interface part 103 of the OLT 101 and the optical transmission/reception interface part 233 of each of the ONUs 201 to 203. The optical transmission/reception process allows the upstream optical transmission power values and the downstream optical reception power values held in the ONUs 201 to 203 to be transmitted to the OLT 101.

In the following, taking the ONU 203 as a representative of the ONUs 201 to 203, a method for obtaining the downstream optical transmission power value of the OLT 101 and the downstream optical reception power value of the ONU 203 in the communication between the OLT 101 and the ONU 203 will be described. The DDM function, which is specified in the SFF-8472 standard as mentioned above, is used as a method for obtaining the downstream optical transmission/reception power values.

The OLT 101 and the ONU 203 include the optical transmission/reception interface part 103 and the optical transmission/reception interface part 233, respectively. Each of the optical transmission/reception interface parts 103 and 233 is provided with the above-mentioned DDM function. The optical transmission/reception interface part 103 exerts a transmission power acquisition function that enables acquisition of the downstream optical transmission power value. The optical transmission/reception interface part 233 exerts a reception power acquisition function that enables acquisition of the downstream optical reception power value. The optical transmission/reception interface parts 103 and 233 are also able to obtain their temperature information and the like.

By using the DDM function (including a power information acquisition function having the transmission power acquisition function and the reception power acquisition function), the OLT 101 and each of the ONUs 201 to 203 is able to obtain the downstream (optical) transmission power value and the downstream (optical) reception power value in transmission and reception between the OLT 101 and each of the ONUs 201 to 203.

As described above, by the OAM function, each of the ONUs 201 to 203 incorporates the obtained downstream reception power value into an OLT frame, to enable the downstream reception power value to be transmitted to the OLT 101. The OAM function, which is a function specified in the IEEE 802.3ah, enables a control of the ONU by using an OAM frame. The OAM function provides an interface that inserts the obtained optical transmission/reception power value into the OAM frame to thereby notify the OLT thereof.

In this manner, the reception power value obtained by the ONU 203 is incorporated into the OAM frame by the OAM frame transmission/reception part 234 using the OAM function, and thus can be notified to the OAM frame transmission/reception part 104 of the OLT 101 via the optical transmission/reception interface part 233 and the optical transmission/reception interface part 103. As a result, the OLT 101 is able to obtain the reception power value of the ONU 203.

Moreover, the OLT 101 has a transmission distance calculation function for calculating a transmission distance Li based on the measurement value RTT. The transmission distance Li is a distance between the OLT 101 and each of the ONUs 201 to 203. The transmission distance Li between the OLT 101 and the ONU 20$i$ is calculated by applying the measurement value RTT to the following expression (1).

[Math. 1]

$$Li = \frac{(RTT - Td) \cdot Pm \cdot 10^{-3}}{2} \quad (1)$$

In the expression (1), Td represents a processing delay within the device (for example, 110 TQ (1TQ=16 ns)), and Pm represents a variable distance (for example, 3.2[m/TQ]). Td and Pm are fixed values that can be set in advance. In the expression (1), $10^{-3}$ in the final term is a conversion constant for conversion between "m" and "km".

In this manner, the OLT 101 is able to obtain the transmission distance Li (distance-related information), the downstream transmission power value, and the downstream reception power value (transmission-channel-loss parameter group) in transmission and reception between the OLT 101 and each of the ONUs 201 to 203.

The OLT 101 is configured to output, from the OAM frame transmission/reception part 104 to the PON topology generation part 402 provided in the monitor control system 401, a plurality of (three) transmission distances Li and a plurality of downstream transmission power values and downstream reception power values (a plurality of transmission-channel-loss parameter groups), which are the transmission distances Li, the downstream transmission power values, and the downstream reception power values in transmission and reception between the OLT 101 and the ONUs 201 to 203.

The PON topology generation part 402 receives the plurality of transmission distances Li, the plurality of downstream transmission power values, and the plurality of downstream reception power values, and then performs a topology map generation process based on the received information, to generate a (PON) topology map. The topology map means a network configuration between the OLT 101 and the ONUs 201 to 203 made by the optical fiber 250 and the optical splitter 300.

That is, a PON topology configuration is automatically calculated by the PON topology generation part 402, thereby enabling generation of a topology map. The PON topology generation part 402 is provided in the monitor control system 401, and the PON topology map is automatically calculated by the PON topology generation part 402. Therefore, in a case of communication disconnection due to, for example, disconnection of the optical fiber, a failure of the optical splitter, or the like, a location where the failure is occurring can be remotely and quickly identified with reference to the topology map based on a link disconnection information of the ONU. This can shorten a time period for which the service is stopped. Additionally, the labor for maintenance and monitoring of the network system can be saved, to achieve a reduction in the environment load and a reduction in the costs.

<Topology Map Generation Process>
(OLT Holds)

The PON topology is generated based on the above-described information. At that time, the information needs to be held as a system parameter or a fixed value in the OLT 101.

Figures 2, 3:
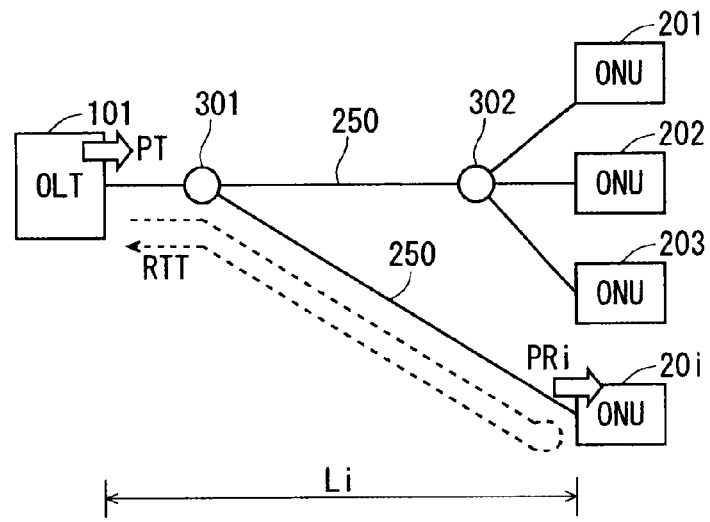
[FIG. 2] An explanatory diagram schematically showing the relationship between a transmission distance Li and a measurement value RTT.
[FIG. 3] An explanatory diagram showing contents of group processing in a topology map generation process.

FIG. 2 is an explanatory diagram schematically showing the relationship between the transmission distance Li and the measurement value RTT. As shown in FIG. 2, the OLT 101 is connected to the ONUs 201 to 203 by the optical fiber 250 in which two optical splitters 301 and 302 are provided, and the OLT 101 is connected to the ONU 20$i$ ($i$=any of one to n (n≥4)) by the optical fiber 250 in which one optical splitter 301 is provided.

In this configuration, the OLT 101 performs the above-described RTT measurement to obtain the measurement value RTT, and then calculates the transmission distance Li between the OLT 101 and the ONU 20$i$ by applying the RTT to the expression (1) above.

Table 1 shows topology map information that the OLT 101 holds and transmits from the OpS interface part 105 to the PON topology generation part 402.

TABLE 1

| Type | Parameter | Contents | Unit |
|---|---|---|---|
| Device | PT | Downstream transmission power of OLT | dBm |
| | PRi | Downstream reception power of OLUi | dBm |
| | Li | Transmission distance | km |

TABLE 1-continued

| Type | Parameter | Contents | Unit |
|---|---|---|---|
| Common | LF | Unit fiber loss | dB/km |
| | Lc | Unit splitter loss | dB/2branches |
| | DL | Tolerance for difference in distance | km |
| | DNC | Tolerance for the number of 2-branches | — |

As shown in Table 1, the topology map information includes distance-related information, transmission/reception power information, and fixed value information. The distance-related information specifies the transmission distance Li between the OLT 101 and the ONU 20$i$ which is obtained by the expression (1). The transmission/reception power information specifies the downstream transmission power value PT of the OLT 101 and the downstream reception power value PRi of each ONU 20$i$. The fixed value information includes a unit fiber loss LF, a unit splitter loss Lc, a tolerance DL, and a tolerance DNC.

(Topology Map Generation Process Performed by PON Topology Generation Part 402)

In the following, the topology map generation process that the PON topology generation part 402 performs based on the above-described topology map information will be described.

(0. Preparation Process)

The topology map generation process is a process for generating a PON topology map in a network system with a PON including an OLT (for example, the OLT 101 shown in FIG. 1) and a plurality of ONUs (for example, the ONUs 201 to 203 shown in FIG. 1).

The OLT applies to the expression (1) the measurement value RTT obtained by the P2MP discovery function described above, and thereby obtains, as the distance-related information, the transmission distance Li to each of the plurality of ONUs. That is, the transmission distance Li itself serves as the distance-related information.

Additionally, the above-described P2MP function allows the OLT to obtain power information (first power information) that includes the downstream transmission power value PT of the OLT and the downstream reception power value PRi of each of the plurality of ONUs at a time of downstream transmission from the OLT to each of the plurality of ONUs.

Through a preparation process in which the distance-related information, the power information, and the fixed value information shown in Table 1 are obtained from the OpS interface part 105 of the OLT 101, the PON topology generation part 402 of the monitor control system 401 is able to perform the topology map generation process.

(1. Calculation of the number of 2-branches between OLT and ONU)

(1-1. Process for Calculating Transmission Channel Loss)

Firstly, the PON topology generation part 402 applies to the following expression (2) the downstream transmission power value PT of the OLT and the downstream reception power value PRi of each ONUi ($i$=any of one to n (n>3)) which are contained in the power information, and thereby calculates a transmission channel loss LTi between the OLT and each of the plurality of ONUs. This embodiment is based on the assumption that the downstream transmission power values PT set to all the ONUs are the same. Needless to say, the downstream transmission power value PTi is obtained with respect to each ONUi in a case where different downstream transmission power values PT are set to different ONUi.

[Math. 2]

$$LTi = PT - PRi \quad (2)$$

(1-2. Process for Calculating Optical Fiber Loss)

Then, the PON topology generation part 402 applies to the expression (3) the transmission distance Li between the OLT and each of the plurality of ONUs which is contained in the distance-related information and the unit fiber loss LF which is contained in the fixed value information, and thereby calculates a fiber loss LFi which is the amount of loss caused due to transmission between the OLT and each of the plurality of ONUs through the optical fiber.

[Math. 3]

$$LFi = Li \cdot LF \quad (3)$$

(1-3. Process for Calculating the Number Nci of 2-branches)

The optical splitter includes a plurality of unit splitters in combination. The unit splitter in the minimum unit has two branches. For example, in a case of an optical splitter having four branches, two unit splitters each of which is the minimum unit with two branches are connected in two stages in a tree-like fashion.

Therefore, the number Nci of 2-branches, which is the number of unit splitters provided between the OLT and the plurality of ONUs, is calculated by applying to the expression (4) the transmission channel loss LTi, the fiber loss LFi, and the unit splitter loss Lc obtained by the expressions (2) and (3) above.

[Math. 4]

$$Nci = \frac{LTi - LFi}{Lc} = \frac{(PT - PRi) - Li \cdot LF}{Lc} \quad (4)$$

Through the above-described items 1-1 to 1-3, the number Nci of 2-branches which is the number of unit splitters provided on an optical fiber transmission path between the OLT and each of the plurality of ONUi can be calculated.

(1-4. Exception Handling)

Normally, "PT>PRi" and "(PT−PRi)>LI·LF" are established between the downstream transmission power value PT and the downstream reception power value PRi. Thus, the number Nci of 2-branches is normally equal to or greater than "1". Therefore, the number Nci of 2-branches being less than "1" means that a correct value could not be obtained because of a failure of the ONU or the like. When such a ONU occurs, it is desirable that a maintenance person or the like is notified of the fact that a malfunction ONU is being connected.

(2. Grouping Processing)

The PON topology generation part 402 primarily uses the number Nci of 2-branches, and secondarily uses the transmission distance Li, to classify the plurality of ONUs into a predetermined number of groups. Each of the predetermined number of groups means a group of ONUs that belong to the same group and that are commonly connected to the same closest splitter.

FIGS. 3 to 10 are explanatory diagrams showing contents of the group processing in the topology map generation process. In FIGS. 3 to 7 and FIGS. 9 and 10, an ONU location information table is shown in the form of a table.

For each of the plurality of ONUs, an ONU location information table including an ONU number, the number Nci of 2-branches, the transmission distance Li, and a group number is generated, as shown in FIG. 3.

(2-1. First Sorting based on the Number Nci of 2-Branches)

As shown in FIG. 4, the number Nci of 2-branches and the transmission distance Li of each ONUi, which have been already obtained, are stored in the ONU location information table. At this time, the ONUs are sorted in ascending order of the number Nci of 2-branches (first sorting).

(2-2. Second Sorting based on Transmission Distance Li)

Then, as shown in FIG. 5, with respect to each set of ONUs having the same number Nci of 2-branches, the ONUs in each set are sorted in ascending order of the transmission distance Li (second sorting). As a result, the plurality of ONUs are sorted based on the number Nci of 2-branches as a first criterion and the transmission distance Li as a second criterion.

(2-3. Setting of Group Number)

Then, the plurality of ONUs are classified into a predetermined number of groups based on the following grouping conditions (a) to (d).

(a) A subset of ONUs, which includes ONUs having the same number Nci of 2-branches, is classified as a tentative group.

(b) In the tentative group, when a difference in distance from the head ONU in the tentative group exceeds a tolerance DL, ONUs within the tolerance DL are determined into a main group, and the other ONUs beyond the tolerance DL are determined into a next tentative group.

(c) When the difference in distance is within the tolerance DL but the number of ONUs belonging to the tentative group exceeds an allowable number DB, ONUs within the allowable number DB are determined into a main group, and the other ONUs beyond the allowable number DB are determined into a next tentative group.

(d) In a case where all the ONUs belonging to the tentative group do no satisfy the above-described conditions (b) and (c), the tentative group is determined as a main group without any change.

Moreover, in the next tentative group obtained as a result of the classification based on the conditions (b) or (c), the ONUs are further classified into a main group based on the conditions (b) to (d).

FIG. 6 shows, in the form of a table, an example case where a plurality of ONUs are classified into a predetermined number of groups based on the grouping conditions (a) to (c), and group numbers are given to the groups. FIG. 6 shows a case of the tolerance DL=10 and the allowable number DB=8. The state shown in FIG. 6 is a completed form of the ONU location information table.

The group numbers in the ONU location information table having the contents shown in FIG. 6 are determined through the following processing based on the grouping conditions (a) to (d) described above.

Among ONUs having the ONU numbers "1" to "14" . . . which have been initially classified as a tentative group based on the condition (a), the ONU having the ONU number "9" corresponds to the condition (c) because the allowable number DB=8. As a result, the ONUs having the ONU numbers "1" to "8" are classified into a main group (group number "1"), and the ONUs having the ONU number "9" and subsequent ONU numbers are classified into a next tentative group.

Among the ONUs having the ONU numbers "9" to "14" . . . which have been classified as a next tentative group, the ONU having the ONU number "13" corresponds to the condition (b) because DL=10. As a result, the ONUs having the ONU numbers "9" to "12" are classified into a main group (group number "2"), and the ONUs having the ONU number "13" and subsequent ONU numbers are classified into a next tentative group.

Then, when either one of the conditions (b) to (d) is satisfied, the ONUs having the ONU numbers "13" and "14" are classified into a main group (group number "3").

(2-4. Initial Generation of Group Information Table)

A group information table shown in FIG. 7 is generated based on the completed ONU location information table shown in FIG. 6. The group information table includes a group number, the number Nj of belonging ONUs, the number Ncj of 2-branches in the group, a shortest distance Lminj, the number Cj of remaining 2-branches, and an ONU-closest splitter ID. The number Nj of belonging ONUs means the number of ONUs belonging to the group. The number Ncj of 2-branches in the group means the number of 2-branches of splitters necessary for direct connection of the ONUs belonging to the group. The shortest distance Lminj means the minimum value of the transmission distance Li in each group. The number Cj of remaining 2-branches means the number of splitters that are allowed to be provided between the closest splitter and a first-stage splitter. The ONU-closest splitter ID means the ID of a splitter to which each ONU of the group is directly connected. The value of the number Ncj of 2-branches in the group is initially set as the number Cj of remaining 2-branches.

Figure 8:
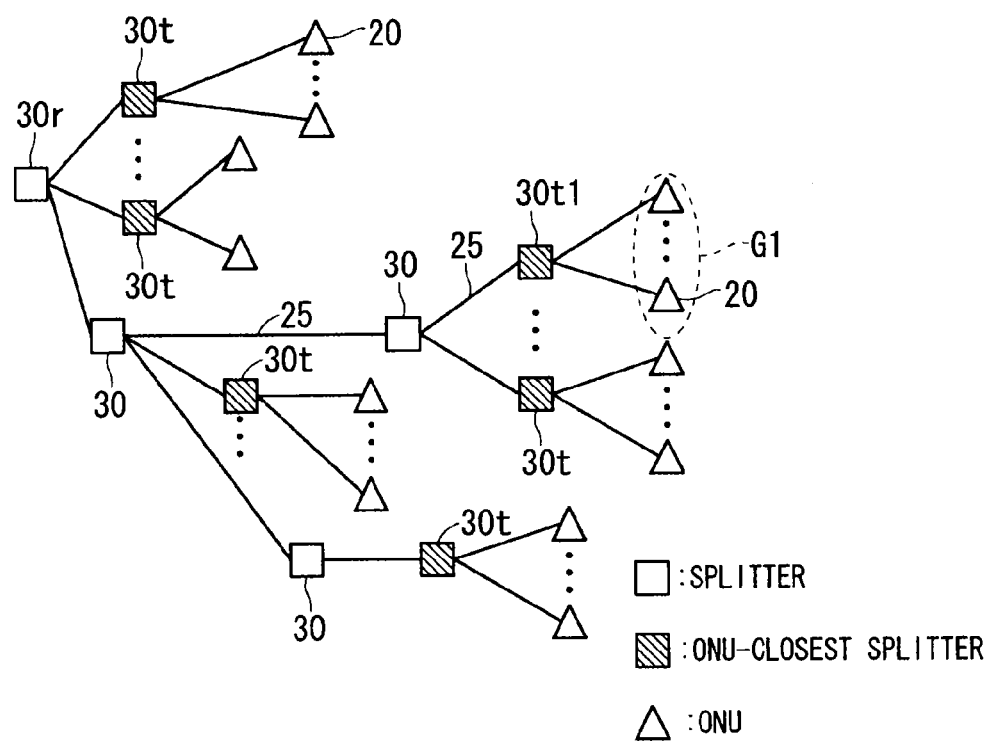
[FIG. 8] An explanatory diagram showing contents of the group processing in the topology map generation process.

FIG. 8 is an explanatory diagram schematically showing the ONU-closest splitters. As shown in FIG. 8, the optical fiber 25 extending from a first-stage splitter 30r is divided by splitters 30 (30t) and then connected to the terminals ONU 20, so that the PON is made. At this time, the ONUs 20 belonging to the corresponding group is directly connected to the ONU-closest splitters 30t. For example, all of ONUs 20 belonging to an ONU group G1 are connected to the ONU-closest splitter 30t1 that is closest to them.

(2-5. Determination of Dimension of ONU-closest Splitter (the Number of Branches))

The dimension CZj of the ONU-closest splitter in each group j is obtained based on the number Nj of belonging ONUs. The dimension CZj of the ONU-closest splitter is ($=\log_2 X$), where X represents the minimum value among $\{2, 4, 8, 16, 32, \ldots\}$ that is equal to or less than the number Nj of belonging ONUs.

More specifically, in a case where the number Nj of belonging ONUs is $\{1,2\}$ (X=2), the dimension CZj of the ONU-closest splitter is "1", and in a case where the number Nj of belonging ONUs is $\{3,4\}$ (X=4), the dimension CZj of the ONU-closest splitter is "2", and in a case where the number Nj of belonging ONUs is $\{5 \text{ to } 8\}$ (X=8), the dimension CZj of the ONU-closest splitter is "3".

Here, for example, in a case of X=8, whether there are unit splitters in the form of three-stage tree or there is one-stage splitter having the 8×1 configuration is not distinguishable. Therefore, the dimension CZj of the ONU-closest splitter is set to be "3" such that both of the former and latter cases are covered.

(2-6. Calculation of the Number Cj of Remaining 2-branches)

Then, as shown in FIG. 9, with respect to each group j, the dimension CZj of the ONU-closest splitter is subtracted from the number Ncj of 2-branches in the group, to calculate the number Cj of remaining 2-branches $\{=Ncj-CZj\}$. In a case of $\{Ncj-CZj\}<0$, the number Cj of remaining 2-branches is set to be "0". In the field of the number Cj of remaining 2-branches shown in FIG. 9, the numeral in the parentheses means the dimension CZj of the ONU-closest splitter.

(2-7. Completion of Group Information Table)

Finally, as shown in FIG. 10, the data is sorted in ascending order of the number Cj of remaining 2-branches. Thereby, the group information table is completed.

(3. Splitter Tree Generation Process)

Figures 11, 12:
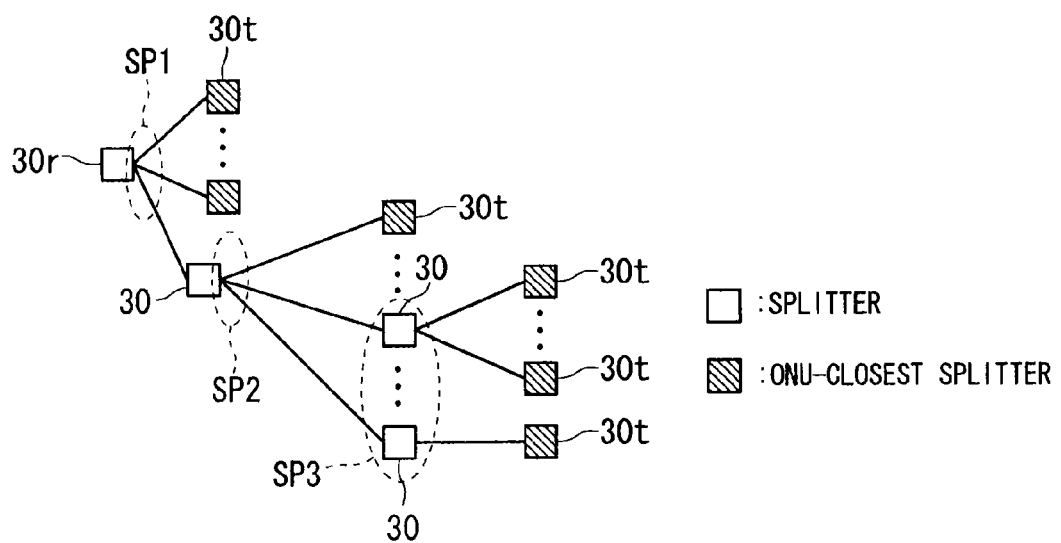
[FIG. 11] An explanatory diagram showing outline of a splitter tree.
[FIG. 12] An explanatory diagram showing a splitter tree generation process.

FIG. 11 is an explanatory diagram showing outline of a splitter tree. In FIG. 11, it is confirmed that the ONUs 20 belonging to the corresponding group j in the group information table are directly connected to the ONU-closest splitter 30t.

Thereafter, accordingly, a splitter tree generation process is a process for recognizing a splitter tree as shown in FIG. 11 by calculating the stage order (the second stage SP2, the third stage SP3, . . . ) to which each ONU-closest splitter 30t is connected to, counting from the first-stage splitter 30r existing in the first stage SP1.

The final purpose of the splitter tree generation process is for determining the relationship of connection between the ONU-closest splitter and splitters other than the ONU-closest splitter, and the ID of each of the splitters.

To attain the final purpose, the first-stage splitter 30r, which is a splitter directly connected to the OLT, is determined. Firstly, the first-stage splitter is calculated as a route splitter. Then, by using the same algorithm, splitters in the second and subsequent stages are determined as route splitters. This is repeated until the connection destinations of the ONU-closest splitters included in all the groups are determined.

FIGS. 12 to 20 are explanatory diagrams showing the splitter tree generation process. FIGS. 12 to 17, and FIGS. 19 and 20 show the splitter tree generation process in the form of tables. In the following, details of the splitter tree generation process will be described with reference to these drawings.

(3-1. Initial Determination of Route Splitter)

Firstly, the first-stage splitter in the first stage, which is directly connected to the OLT, is initially set as a route splitter, and the ID of this splitter is determined. The ID is managed in the form of a splitter information table as shown in FIG. 12. Referring to FIG. 12, the splitter information table includes the splitter ID, the stage order Sk, the number NUMk of connection, and the parent splitter ID. The stage order Sk means the order of the stage in which the splitter is located (corresponding to SPk of SP1 to SP3 in FIG. 11). The number NUMk of connections means the number of splitters connected in the stage subsequent to this splitter. The parent splitter ID means the splitter ID of a parent splitter that is located in the stage previous and closest to this splitter. Initially, a route ID (root ID) is set as the splitter ID "1".

(3-2. Determination of Second-Stage Splitter)

Then, a second-stage splitter, which is in the stage subsequent and closest to the first-stage splitter having been initially set, is determined as a route splitter. At this time, the number SB of set branches of the route splitter is assumed. For example, a case where the number SB of set branches is set to be "8" is assumed. In this case, the number UC of used 2-branches of the route splitters is "3" (a configuration in which the unit splitters are connected in three stages in a tree-like fashion. Thus, the number UC of used 2-branches is subtracted from the number Cj of remaining 2-branches in each group j. In a case of $\{Cj-UC\}<0$, the number Cj of remaining 2-branches is set to be FIG. 13 shows a state after the number UC of used 2-branches is subtracted from the number Cj of remaining 2-branches in each group j in the group information table. As shown in FIG. 13, the number Cj of remaining 2-branches in the group numbers 1 to 4 is "0".

Therefore, as shown in FIG. 14, IDs (1-1 to 1-4) are given to the group numbers 1 to 4. The IDs (1-1 to 1-4) indicate that the corresponding splitter is the ONU-closest splitter ID in the second stage.

Moreover, as shown in FIG. 15, in the splitter information table, the number NUMk of connections to the route splitter having the splitter ID "1" is set to be "4" (the splitters having the IDs 1-1 to 1-4 are connected). With respect to the splitter IDs "1-1" to "1-4", the stage order Sk is set to be "2", and the number NUMk of connections of the ONU-closest splitter is set to be "1" (an ONU belonging to one group is connected), and the parent splitter ID is set to be "1".

FIG. 16 shows the splitter information table in a case where the number SB of set branches is "4" (that is, the number UC of used 2-branches is "2"). In this case, the number Cj of remaining 2-branches in the group number "4" is "1" (3(Cj)-2(UC)). Therefore, the group number "4" is removed from the candidates to be selected as the second-stage connection splitter. As a result, in the splitter information table, the number NUMk of connections to the route splitter having the splitter ID "1" is set to be "3" (the splitters having the IDs 1-1 to 1-3 are connected), the stage order Sk of the splitter IDs "1-1" to "1-3" is set to be "2", the number NUMk of connections of the ONU-closest splitter is set to be "1", and the parent splitter ID is set to be "1".

(3-3. Change of Route Splitter)

Then, splitters other than the ONU-closest splitter are set in the second stage, and changed to new route splitters of this splitter.

Figures 17, 18:
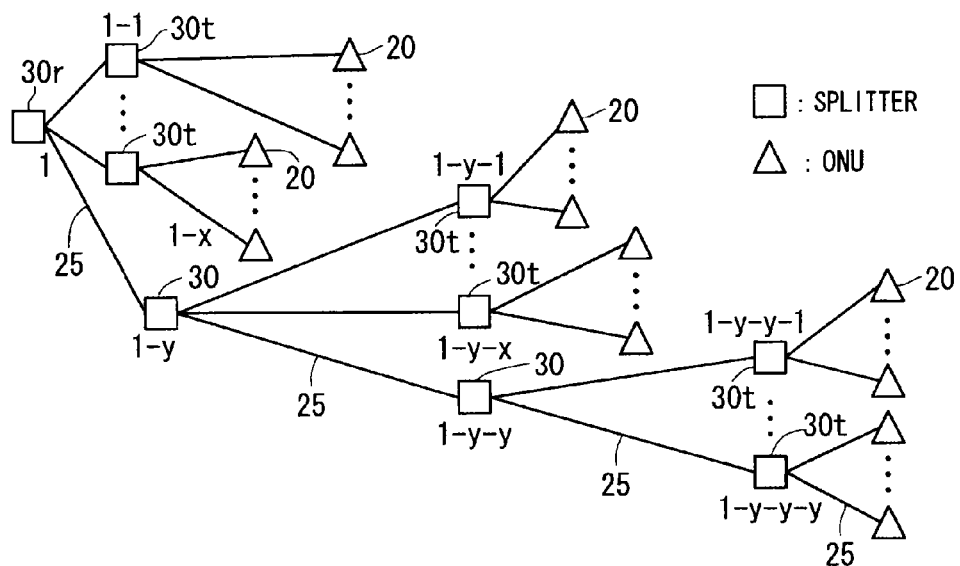
[FIG. 17] An explanatory diagram showing the splitter tree generation process.
[FIG. 18] An explanatory diagram showing the splitter tree generation process.

FIG. 17 shows the splitter information table after the route splitter is changed. In this case, a state immediately before this state is the state shown in FIG. 16. As shown in FIG. 17, in the splitter information table, the stage order Sk of the splitter ID "1-1" is set to be "2", the number NUMk of connections of the ONU-closest splitter is set to be "0" (the number of splitters connected in the subsequent stage is "0"), and the parent splitter ID is set to be "1".

(3-4. Determination of Third-Stage Splitter)

In the group information table, with respect to the group in which the number Cj of remaining 2-branches is not yet "0", the number SB of set branches of the changed route splitter is assumed, and the group in which the number Cj of remaining 2-branches newly becomes "0" is determined as a third-stage splitter, similarly to the process for determining the second-stage splitter as described in (3-2) above.

(3-5. Determination of All ONU-closest splitter IDs)

Subsequently, the process for changing the route splitter and determining the m-stage splitter, which is described in (3-3) and (3-4), is repeated. At a time point when all the ONU-closest splitter IDs are set, the process is terminated. As a result, based on a splitter tree recognized as the completed group information table and splitter information table, a topology map of the PON formed by the optical fiber 25 extending from the first-stage splitter 30r to the ONU-closest splitters 30t via the splitters 30 other than the ONU-closest splitters 30t can be completed as shown in FIG. 18.

FIG. 19 is an explanatory diagram showing an example of the completed group information table. As shown in FIG. 19, the ONU-closest splitter IDs are determined with respect to all the groups. For example, the ONU-closest splitter ID of the group number "1" is "1-1", which is determined as the second-stage splitter that is directly connected to the first-stage splitter 30r. The ONU-closest splitter ID of the group number n is "1-4-2-3-1", which is determined as the fifth-stage splitter.

Figures 20, 21:
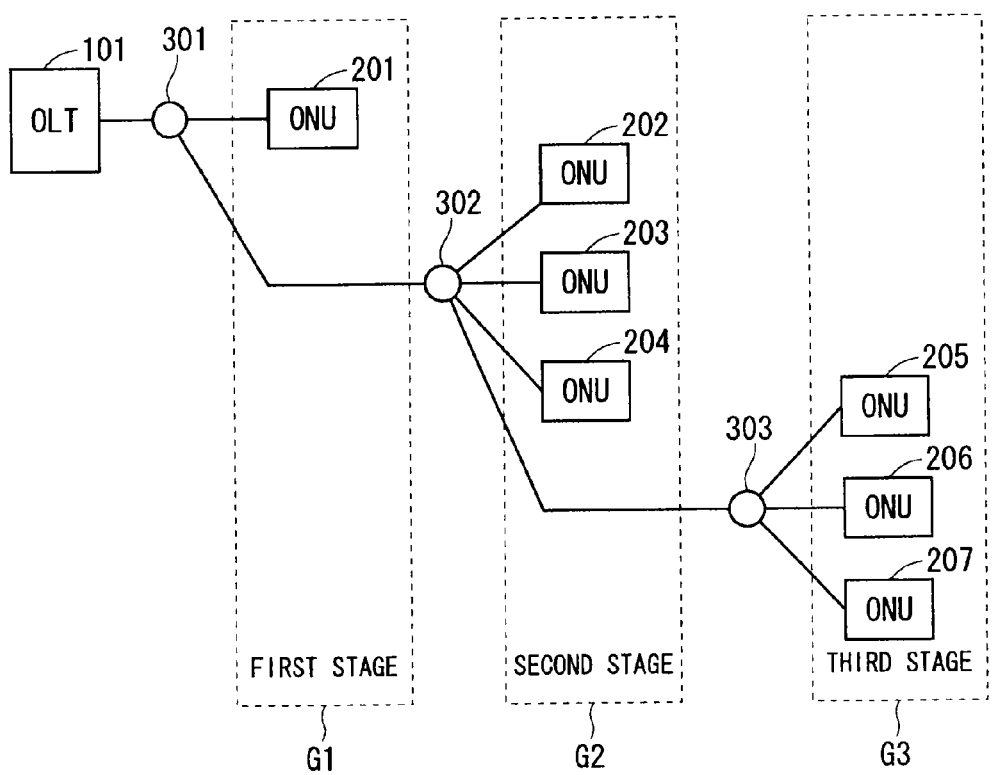
[FIG. 20] An explanatory diagram showing the splitter tree generation process.
[FIG. 21] An explanatory diagram showing an example of use of a topology map that has been automatically generated by the network system according to this embodiment.

FIG. 20 is an explanatory diagram showing an example of the completed splitter information table. As shown in FIG. 20, the stage order Sk, the number NUMk of connections, and the parent splitter ID are stored with respect to all the splitter IDs.

(Example of Use of Topology Map)

FIGS. 21 and 22 are explanatory diagrams showing an example of use of the topology map that is automatically generated by the PON topology generation part 402 in the network system according to this embodiment.

As shown in FIGS. 21 and 22, in the network system including the OLT 101 and the ONUs 201 to 207, the ONU 201 belonging to the ONU group G1 is connected to the OLT 101 via the optical splitter 301 (first stage). The ONUs 202 to 204 belonging to the ONU group G2 are connected to the OLT 101 via the optical splitters 301 and 302 (second stage). The ONUs 205 to 207 belonging to the ONU group G3 are connected to the OLT 101 via the optical splitters 301 to 303 (third stage). Such a relationship of connection among the ONUs 201 to 207 with interposition of the optical splitters 301 to 303 is recognized by referring to the topology map generated by the PON topology generation part 402.

Accordingly, as shown in FIG. 22, when link disconnection occurs in the ONUs 205 to 207 belonging to the ONU group G3 at one time, it is determined that there is a high possibility that a failure is occurring in the optical splitter 303 which is the ONU-closest splitter of the ONU group G3. Therefore, the monitor control system 401 (see FIG. 1) issues a failure estimate alarm concerning the optical splitter 303 to the maintenance person. Thereby, the maintenance person can be notified of an estimated location where the failure is occurring.

(Effects)

The network system having the PON configuration of this embodiment includes the PON topology generation part 402 that generates a topology map by performing the topology map generation process based on the plurality of transmission distances Li (the plurality of distance-related information) and the plurality of downstream transmission power values PT and downstream reception power values PRi (the plurality of transmission-channel-loss parameter groups), thereby enabling automatic generation of a topology map within the network system.

Moreover, in the network system of this embodiment, the OLT 101 has the P2MP discovery function (the transmission distance calculation function included in the distance information acquisition function) for calculating the transmission distance Li itself, which eliminates the need that the PON topology generation part 402 has a function for calculating the transmission distance Li. This can accordingly simplify the configuration of the PON topology generation part 402.

Additionally, by the transmission function achieved by the OpS interface part 105 of the OLT 101, the PON topology generation part 402 receives the information (the plurality of transmission distances Li and the plurality of downstream transmission power values PT and downstream reception power values PRi) necessary for the generation of the topology map. This enables the information (the information shown in Table 1) necessary for the PON topology generation process to be obtained relatively easily.

The PON topology generation part 402 performing the "grouping processing" detailed in the item 2 primarily uses the plurality of numbers Nci of 2-branches and secondarily uses the plurality of transmission distances Li. Thereby, the plurality of ONUS can be accurately classified into a predetermined number of groups commonly connected to the same ONU-closest splitter.

Furthermore, the "splitter tree generation process" detailed in the item 3 is performed, so that the splitter tree can be accurately generated based on the number Cj of remaining 2-branches which is a predetermined number. As a result, the PON topology generation part 402 is able to obtain a highly accurate topology map.

The P2MP discovery function (the function for obtaining distance information) for measuring the measurement value RTT and calculating the transmission distance Li is already provided based on the PON standard specification. Therefore, providing the power information acquisition function for obtaining the downstream transmission power value PT and the downstream reception power value PRi between the OLT and the plurality of ONUs allows the configuration necessary for the present invention to be relatively easily achieved between the OLT and the plurality of ONUs.

In the topology map generation method performed by the PON topology generation part 402 of this embodiment, the topology map is generated by performing the "Process for Calculating the Number Nci of 2-branches" described in the item 1, the "Grouping Processing" described in the item 2, and the "Splitter Tree Generation Process" described in the item 3, based on the plurality of transmission distances Li and the plurality of downstream transmission power values PT and downstream reception power values PRi.

Accordingly, using the topology map generation method performed by the PON topology generation part 402 enables automatic generation of a topology map with the prerequisite that the plurality of transmission distances Li and the plurality of downstream transmission power values PT and downstream reception power values PRi be obtained.

(Others)

In this embodiment, the power information (first power information) including the downstream transmission power value PT of the OLT and the downstream reception power values PRi of the plurality of ONUs at a time of downstream transmission from the OLT to the plurality of ONUs is obtained. Instead, however, power at a time of upstream transmission may be adoptable as the power information.

More specifically, power information (second power information) including the upstream transmission power values PT2i of the plurality of ONUs and the upstream reception power value PR2i of the OLT at a time of upstream transmission from the plurality of ONUs to the OLT may be used as the transmission-channel-loss parameter group. In this case, in the expressions (2) and (4) mentioned above, the "PT2i" and "PR2i" are used instead of "PT" and "PRi", respectively.

In this embodiment, the OLT 101 calculates the transmission distance Li based on the measured measurement value RTT, and then transmits the transmission distance Li itself serving as the transmission distance-related information to the PON topology generation part 402.

Alternatively, a configuration is also acceptable in which the OLT 101 transmits the measurement value RTT serving as the transmission distance-related information to the PON topology generation part 402 and the PON topology generation part 402 applies the expression (1) to calculate the transmission distance Li.

While the invention has been described in detail, the foregoing description is in all aspects illustrative and not restrictive. It is therefore understood that numerous modifications and variations not illustrated herein can be devised without departing from the scope of the invention.

The invention claimed is:

1. A network system with a predetermined network including an OLT and a plurality of ONUs,
   said OLT having a distance information acquisition function for obtaining distance-related information concerning a transmission distance between said OLT and each of said plurality of ONUs,
   a power information acquisition function provided in between said OLT and said plurality of ONUs for obtaining at least one of first power information and second power information as a transmission-channel-loss parameter group, said first power information including a downstream transmission power value of said OLT and downstream reception power values of said plurality of ONUs at a time of downstream transmission from said OLT to said plurality of ONUs, said second power information including upstream transmission power values of said plurality of ONUs and an upstream reception power value of said OLT at a time of upstream transmission from said plurality of ONUs to said OLT,
   said network system further including a topology map generation part for generating a topology map by performing a topology map generation process based on a plurality of distance-related information and a plurality of transmission-channel-loss parameter groups that are a plurality of said distance-related information and a plurality of said transmission-channel-loss parameter groups between said OLT and said plurality of ONUs,
   said topology map generation process comprising the steps of:
   (a) calculating a plurality of numbers of 2-branches that are the numbers of 2-branches of splitters on a transmission path between said OLT and said plurality of ONUs, based on a plurality of transmission distances and said plurality of transmission-channel-loss parameter groups, said plurality of transmission distances being transmission distances between said OLT and said plurality of ONUs and obtained by said plurality of distance-related information; and
   (b) generating said topology map based on said plurality of numbers of 2-branches and said plurality of transmission distances.

2. The network system according to claim 1, wherein
   said distance information acquisition function includes a transmission distance calculation function for measuring a time for transmission/reception between said OLT and each of said plurality of ONUs and calculating said transmission distance based on said time for transmission/reception,
   said distance-related information includes information indicating said transmission distance itself,
   said OLT has a transmission power acquisition function for obtaining said downstream transmission power value at a time of transmission to each of said plurality of ONUs,
   each of said plurality of ONUs has a reception power acquisition function for obtaining said downstream reception power value at a time reception,
   said power information acquisition function includes said transmission power acquisition function exerted by said OLT and said reception power acquisition function exerted by each of said plurality of ONUs,
   said plurality of transmission-channel-loss parameter groups include a plurality of downstream transmission power values and a plurality of downstream reception power values that are a plurality of first power information.

3. The network system according to claim 2, wherein
   said OLT receives said plurality of downstream reception power values from said plurality of ONUs, and said OLT includes a transmission part configured to transmit said plurality of distance-related information, said plurality of downstream transmission power values and said plurality of downstream reception power values to said topology map generation part.

4. The network system according to claim 1, wherein said step (b) includes the steps of:
(b-1) tentatively classifying said plurality of ONUs based on said plurality of numbers of 2-branches;
(b-2) classifying said plurality of ONUs having been tentatively classified in said step (b-1) into a predetermined number of groups under a grouping condition that is based on said plurality of transmission distances, said predetermined number of groups defined such that ONUs belonging to the same group are commonly connected to the same closest splitter;
(b-3) calculating the predetermined number of remaining 2-branches that is the number of 2-branches allowed to be further connected in a stage previous to said closest splitter in each of said predetermined number of groups; and
(b-4) based on said predetermined number of remaining 2-branches, generating said topology map by generating a splitter tree extending from a first-stage splitter directly connected to said OLT to the closest splitter in said predetermined number of groups.

5. The network system according to claim 1, wherein said predetermined network includes a passive optical network (PON).

6. A topology map generation method for generating a topology map in a predetermined network including an OLT and a plurality of ONUs,
said OLT having a distance information acquisition function for obtaining distance-related information concerning a transmission distance between said OLT and each of said plurality of ONUs,
a power information acquisition function provided in between said OLT and said plurality of ONUs for calculating at least one of first power information and second power information as a transmission-channel-loss parameter group, said first power information including a downstream transmission power value of said OLT and downstream reception power values of said plurality of ONUs at a time of downstream transmission from said OLT to said plurality of ONUs, said second power information including upstream transmission power values of said plurality of ONUs and an upstream reception power value of said OLT at a time of upstream transmission from said plurality of ONUs to said OLT,
in said topology map generation method, said distance-related information and said transmission-channel-loss parameter group obtained as a plurality of distance-related information and a plurality of transmission-channel-loss parameter groups,
said topology map generation method comprising the steps of:
(a) calculating a plurality of numbers of 2-branches that are the numbers of 2-branches of splitters on a transmission path between said OLT and said plurality of ONUs, based on a plurality of transmission distances and said plurality of transmission-channel-loss parameter groups, said plurality of transmission distances being transmission distances between said OLT and said plurality of ONUs and obtained by said plurality of distance-related information; and
(b) generating said topology map based on said plurality of numbers of 2-branches and said plurality of transmission distances.

\* \* \* \* \*